No. 817,536. PATENTED APR. 10, 1906.
G. X. WENDLING.
COLLAR BUTTON.
APPLICATION FILED NOV. 2, 1905.
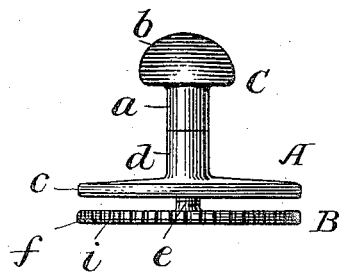
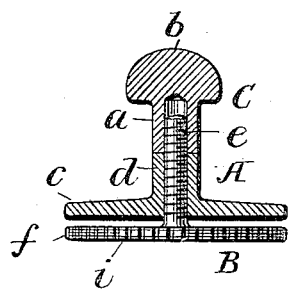
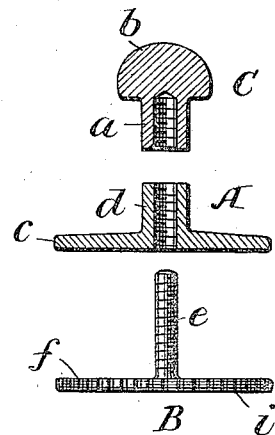
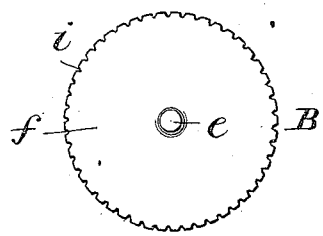
Witnesses
Inventor
George X. Wendling
by Foster Freeman & Watson
Attorneys

UNITED STATES PATENT OFFICE.

GEORGE X. WENDLING, OF SAN FRANCISCO, CALIFORNIA.

COLLAR-BUTTON.

No. 817,536.  Specification of Letters Patent.  Patented April 10, 1906.

Application filed November 2, 1905. Serial No. 285,624.

*To all whom it may concern:*

Be it known that I, GEORGE X. WENDLING, a citizen of the United States, residing at San Francisco, in the county of San Francisco and State of California, have invented certain new and useful Improvements in Collar-Buttons, of which the following is a specification.

My improvement relates to that class of buttons or studs in which a stud with a stem, head, and flange screws upon a flanged stem, and has for its object to prevent the parts from becoming detached, to which end I construct the parts as fully set forth hereinafter, and as illustrated in the accompanying drawings, in which—

Figure 1 is an external view of a collar-button constructed in accordance with my improvement; Fig. 2, a view in section through the stud portion; Fig. 3, a view showing different parts detached; Fig. 4, a plan of the inner member of the button.

The button consists of three parts A, B, and C. The member A has a hollow threaded stem $d$ with a flange $c$ at the inner end. The member B has a threaded stem $e$, adapted to the threaded socket of the member A and long enough to project beyond the latter. At the inner end of the stem $e$ is a flange $f$, with serrations $i$ at the edge. The member C has a head $b$ and a stem $a$, which is socketed and threaded and adapted to the end of the stem $e$.

In applying the button to a garment the stem $e$ is passed through the buttonhole and the member A is screwed onto the said stem, which can be prevented from turning by gripping the edge of the flange $f$, the serrations affording a proper hold for this purpose, so that the member A can be turned to tightly clamp the garment between the parts $c$ and $f$. After this is done the member C is screwed onto the projecting end of the stem $e$, and when screwed tightly down it acts as a jam-nut to prevent the member A from turning, while the latter also acts as a jam-nut to prevent the member C from turning. This is especially important in view of the fact that in many cases the member C will have a socket for receiving a precious stone.

I claim—

A collar-button consisting of the members A, B, C, the member B having a threaded stem and disk with serrations at the edge, the member A having a hollow threaded stem and disk at one end, and the member C having a head and socketed stem with internal threads all substantially as set forth.

In testimony whereof I affix my signature in presence of two witnesses.

GEORGE X. WENDLING.

Witnesses:
CHARLES E. FOSTER.
EDWIN S. CLARKSON